US012339535B2

(12) United States Patent
Lee et al.

(10) Patent No.: US 12,339,535 B2
(45) Date of Patent: Jun. 24, 2025

(54) DISPLAY DEVICE WITH SELECTIVE VIEWING ANGLES

(71) Applicant: SAMSUNG DISPLAY CO., LTD., Yongin-si (KR)

(72) Inventors: Sukhun Lee, Yongin-si (KR); Chaehee Park, Yongin-si (KR); Kihyun Pyo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/608,222

(22) Filed: Mar. 18, 2024

(65) Prior Publication Data

US 2025/0028198 A1     Jan. 23, 2025

(30) Foreign Application Priority Data

Jul. 21, 2023  (KR) .................. 10-2023-0094967

(51) Int. Cl.
*G02F 1/13* (2006.01)
*G02F 1/1333* (2006.01)

(52) U.S. Cl.
CPC ........ *G02F 1/13336* (2013.01); *G02F 1/1323* (2013.01)

(58) Field of Classification Search
CPC ..................... G02F 1/13336; G02F 1/1323
See application file for complete search history.

(56) References Cited

U.S. PATENT DOCUMENTS

| 11,454,842 | B2 | 9/2022 | Kim |
| 2018/0210504 | A1* | 7/2018 | Moser .................. G06F 1/1679 |
| 2018/0293963 | A1 | 10/2018 | Kim et al. |
| 2022/0050314 | A1 | 2/2022 | Hsieh et al. |

FOREIGN PATENT DOCUMENTS

| KR | 10-2018-113787 | 10/2018 |
| KR | 10-2022-0017546 | 2/2022 |

* cited by examiner

*Primary Examiner* — Donald L Raleigh
(74) *Attorney, Agent, or Firm* — F. CHAU & ASSOCIATES, LLC

(57) ABSTRACT

A display device includes a first display part and a second display part each configured to display images. The second display part is configured to selectively operate in a first mode and a second mode. In the first mode of operation, the second display part displays an image at a first viewing angle. In the second mode of operation, the second display part displays the image at a second viewing angle smaller than the first viewing angle.

20 Claims, 15 Drawing Sheets

DISPLAY DEVICE WITH SELECTIVE VIEWING ANGLES

CROSS-REFERENCE TO RELATED APPLICATION

This U.S. non-provisional patent application claims priority under 35 U.S.C. § 119 to Korean Patent Application No. 10-2023-0094967, filed on Jul. 21, 2023, the disclosure of which is incorporated by reference herein in its entirety.

TECHNICAL FIELD

The present disclosure relates to a display device, and more particularly, to a display device with multiple display parts configured to provide selective viewing angles.

DISCUSSION OF THE RELATED ART

Display devices used in various devices, such as televisions, mobile phones, tablets, vehicles, etc., are being developed. Restrictions on a viewing angle of the display devices are required in accordance with a usage environment that requires information protection or regulations for safety. Accordingly, researches are being carried out to limit the viewing angle.

SUMMARY

Embodiments of the present disclosure include a display device configured to display content at selective viewing angles. Accordingly, embodiments provide increased privacy for a user by enabling a portion of the display to act as a privacy screen for sensitive information, such as banking notifications and the like.

Embodiments of the present disclosure include a display device with a first display part and a second display part. The second display part is configured to selectively operate in a first mode and a second mode, wherein in the first mode, the second display part displays an image at a first viewing angle, and in the second mode, the second display part displays the image at a second viewing angle smaller than the first viewing angle, and wherein the second image displayed through the second display part in the second mode has a resolution lower than a resolution of the first image displayed through the first display part.

The first display part may include a plurality of first pixels, the second display part may include a plurality of second pixels, and the plurality of second pixels include a plurality of first type pixels having the first viewing angle and a plurality of second type pixels having the second viewing angle. In some embodiments, only the second type pixels operate in the second mode.

The first display part may include a plurality of first pixels, the second display part may include a plurality of second pixels, and a pixel density of the plurality of second pixels may be lower than a pixel density of the first pixels. A resolution of the image displayed through the second display part in the second mode may be lower than a resolution of the image displayed through the second display part in the first mode. In some embodiments, a resolution of the image displayed through the second display part in the second mode may be substantially the same as a resolution of the image displayed through the second display part in the first mode.

The display device may further include a first display panel including the first display part and a second display panel including the second display part and separated from the first display panel. The second display panel may be smaller than the first display panel.

The first display panel may include a folding area configured to be folded and unfolded, and further includes a plurality of non-folding areas spaced apart from each other with the folding area interposed therebetween. The second display panel may overlap one of the plurality of non-folding areas in a thickness direction of the display device.

The first display panel may display an image to a first direction, and the second display panel may display an image to a second direction opposite to the first direction. The display device may further include a display panel including the first display part and the second display part. The display device may further include at least one sensor disposed to overlap the second display part. The sensor may include, but is not limited to, a camera, a light sensor, or an infrared projector. The second display part may be smaller than the first display part.

The first display part may have a viewing angle greater than the second viewing angle. In other words, the first display part may display images at a viewing angle that is wider than the second viewing angle which the second display part is configured to display when operating in the second mode.

Embodiments of the inventive concept provide a display device include a first display part with a first size and configured to display an image at a first viewing angle, and a second display part with a second size smaller than the first size and configured to selectively operate in a first mode or a second mode. During operation in the first mode, the second display part displays an image at the first viewing angle, and during operation in the second mode, the second display part displays the image at a second viewing angle smaller than the first viewing angle.

The display device may further include a display panel including the first display part and the second display part, and the first and second display parts of the display panel may display the images to the same direction. In some embodiments, the display device further include a first display panel including the first display part and a second display panel including the second display part, and the second display panel may overlap a portion of the first display panel.

A portion of the first display panel may display the image to a first direction, and the second display panel may display the image to a second direction opposite to the first direction. The image displayed through the second display part in the second mode may have a lower resolution than a resolution of the image displayed through the first display part, and the resolution of the image displayed through the second display part in the second mode may be equal to or smaller than a resolution of the image displayed through the second display part in the first mode.

The first display part may include a plurality of first pixels, the second display part may include a plurality of second pixels, the plurality of second pixels may include a plurality of first type pixels having the first viewing angle and a plurality of second type pixels having the second viewing angle. In some embodiments, only the plurality of second type pixels operate in the second mode.

According to the above, the display device includes the first display part and the second display part, where the second display part selectively operates in the first mode where the image is displayed at the first viewing angle or in the second mode where the image is displayed at the second viewing angle smaller than the first viewing angle. A user may manually switch between the first mode and the second mode, or the first mode may switch to the second mode when a specific application is executed. As an example, when a notification pops up with a risk of exposing personal information, such as a message, an incoming call screen, a deposit/withdrawal message, a security message, etc., the notification may be displayed on the second display part, and the operation mode of the second display part may be switched from the first mode to the second mode. Accordingly, the sensitive information may be displayed with a narrower viewing angle, preventing unintended viewers from seeing the information, while other non-sensitive information is displayed at a wider viewing angle. Embodiments thereby increase user privacy and improve the user experience as the user optionally uses the second display part as a personal image display area where the viewing angle is restricted.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

Figure 1:
FIG. 1 is a front view of a display device according to an embodiment of the present disclosure.

Displays are ubiquitous in electronic devices. Users can view various images and video on the displays, and interact with some electronic devices through touch input. In some cases, a user may wish to hide the displayed content of their personal device by limiting its viewing angle. Conventional methods for achieving a limited viewing angle include, for example, affixing a privacy filter to the device.

However, limiting the viewing angle of all the content on the display can decrease the user experience. For example, such a privacy filter can decrease the brightness of all content displayed. In some cases, users may wish to have only sensitive information displayed at a limited viewing angle. Sensitive information can include, for example, banking notifications, email notifications, and other content that includes personally identifying information.

Embodiments of the present disclosure include a display device with first and second display parts. The first display part is configured to display content at a default, wide viewing angle. The second display part is configured to selectively operate in two modes: a first mode which displays content at the wide viewing angle, and a second mode that displays content at a narrow viewing angle, e.g., acting as a "privacy screen." Toggling between the two modes may be performed at will by the user, or may be configured to execute automatically for certain applications on the device. Accordingly, embodiments improve on the user experience by enabling a portion of the information displayed in a display device to be hidden from unwanted viewers, while allowing remaining information to be displayed in a wide viewing angle.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. To the extent that a description of an element has been omitted, it may be understood that the element is at least similar to corresponding elements that are described elsewhere in the specification. In the drawings, the thickness, ratio, and dimension of components may be exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features from a particular perspective or view, e.g. as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

The term "part" or "unit" as used herein is intended to mean a software component or a hardware component that performs a specific function. The hardware component may include, for example, a field-programmable gate array (FPGA) or an application-specific integrated circuit (ASIC). In some cases, the hardware component includes a general purpose processor configured to execute a set of instructions. The software component may refer to an executable code and/or data used by the executable code in an addressable storage medium. Thus, the software components may be, for example, object-oriented software components, class components, and task components, and may include processes, functions, attributes, procedures, subroutines, segments of program code, drivers, firmware, micro codes, circuits, data, a database, data structures, tables, arrays, or variables.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to the accompanying drawings.

Figure 2:
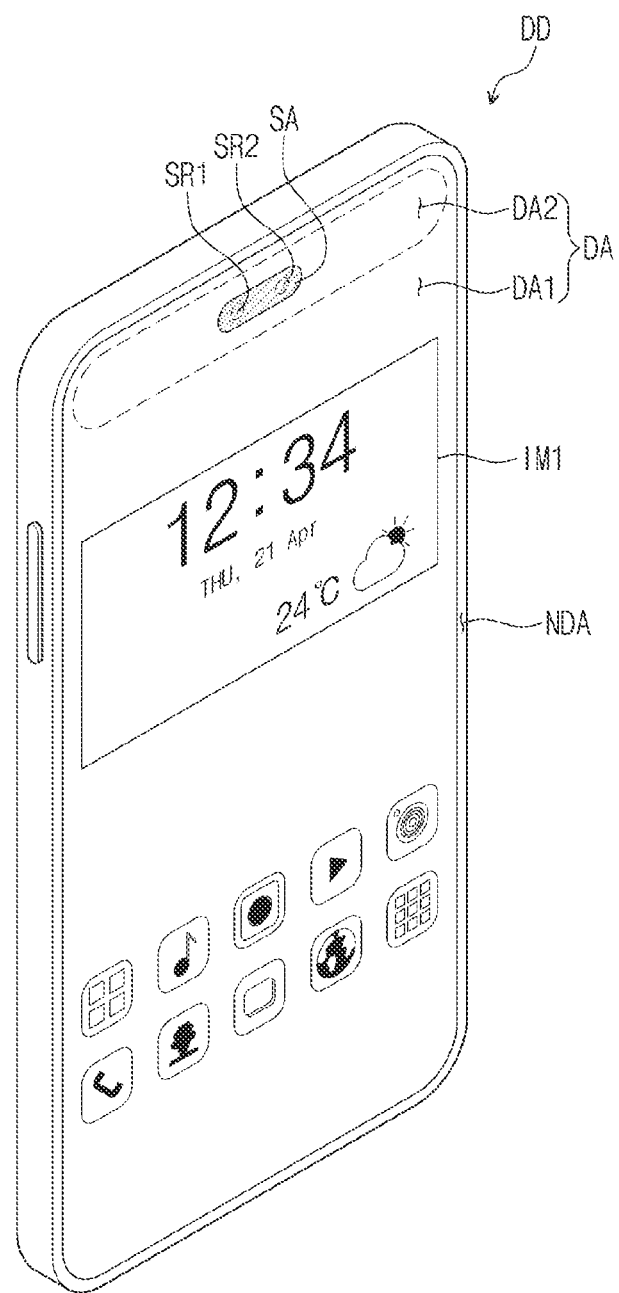
FIG. 2 is a perspective view of a display device according to an embodiment of the present disclosure.

FIG. 1 is a front view of a display device DD according to an embodiment of the present disclosure. FIG. 2 is a perspective view of a display device DD according to an embodiment of the present disclosure. The display devices described herein may be the same display device across the Figures, or may be different embodiments which share one or more features.

Referring to FIGS. 1 and 2, the display device DD may be activated in response to electrical signals. For example, the display device DD may be driven according to one or more drivers, such as a display driver and/or a touch signal driver. The display device DD may be applied to electronic devices, such as a mobile phone, a tablet computer, a smart watch, a notebook computer, a computer, a smart television, etc.

The display device DD includes a display panel DP. The display panel DP may display images IM1 and IM2 through a display area DA. The display area DA may be substantially parallel to a first direction DR1 and a second direction DR2. The display area DA may correspond to a front surface of the display device DD. Each of the images IM1 and IM2 may be a still image or a video. A third direction DR3 may be a surface normal direction of the display area DA, i.e., a thickness direction of the display device DD. Hereinafter, front (or upper) and rear (or lower) surfaces of each layer or each unit of the display device DD may be distinguished from each other in the third direction DR3.

The display area DA of the display panel DP may be an area in which images are displayed. The user may view the images within the display area DA. In the present embodiment, the display area DA may have a quadrangular shape with rounded corners. However, this is merely one example, and the display area DA may be variously shaped according to different embodiments and is not necessarily limited to a quadrangular shape with rounded corners.

In addition, the display panel DP may further include a non-display area NDA adjacent to the display area DA. The non-display area NDA may have a predetermined color. For example, the non-display area NDA may have a color or pattern that is predetermined in a manufacturing process. The non-display area NDA may surround the display area DA. Accordingly, the shape of the display area DA may be substantially determined by the non-display area NDA. However, this is merely one example, and the non-display area NDA may be disposed adjacent to only one side of the display area DA or may be omitted, e.g., a "bezel-free" display.

According to an embodiment, the display area DA may include a first display part DA1 and a second display part DA2. The second display part DA2 may be defined as a portion of an upper end of the display panel DP. As an example, an area of the second display part DA2 may be smaller than an area of the first display part DA1.

The first display part DA1 may display a first image IM1, and the second display part DA2 may display a second image IM2. The first image IM1 and the second image IM2 may be displayed to substantially the same direction. For example, both images may be displayed substantially in the third direction DR3. FIGS. 1 and 2 show widgets that display time, date, and weather information, and application icons as an example of the first image IM1. FIG. 1 shows an incoming call alarm notification as an example of the second image IM2. However, the first image IM1 and the second image IM2 are not limited to these examples.

The second display part DA2 may be selectively operated in a first mode or a second mode. As an example, the first mode may be a normal mode in which the images are displayed at a first viewing angle, and the second mode may be a "privacy mode" in which the images are displayed at a second viewing angle narrower than the first viewing angle. The first display part DA1 may be referred to as a normal display part, a main display part, a first display portion, a first display area, or a first area. The second display part DA2 may be referred to as a variable display part, a privacy display part, a second display portion, a second display area, or a second area.

The first viewing angle and the second viewing angle may each be defined as an angle with respect to the normal line direction of the display area DA at which the images are viewed without distortion. For example, images viewed from an angle with respect to the normal line direction of the display area DA that is greater than the configured viewing angle may have reduced brightness. In some cases, the brightness is reduced such that images viewed at angles greater than the configured viewing angle are not visible. A brightness at the second viewing angle in the second mode may be set in various ways. As an example, the second viewing angle may be about 45 degrees, and the brightness at the angle of about 45 degrees may be about 10 percents of a maximum brightness. A first viewing angle may be a greater (e.g., wider) angle than the second viewing angle. However, these values are only examples and may vary according to embodiments. Examples of first and second viewing angles will be described with reference to FIG. 9.

FIG. 1 is a front view of the display device DD operated in the first mode or the second mode. FIG. 2 is a side surface perspective view of the display device DD operated in the second mode. Referring to FIG. 1, when looking at the display device DD from a front side (or the direction parallel to the normal line direction or the third direction DR3) in the first mode or the second mode, the first and second images IM1 and IM2 generated by the display device DD may be viewed by the user in full brightness and/or quality. Referring to FIG. 2, when looking at the display device DD at an angle greater than the second viewing angle while in the second mode, the second image IM2 (e.g., as illustrated in FIG. 1) displayed through the second display part DA2 may not be visible to a user. In some cases, when looking at the display device DD at the angle greater than the second viewing angle while in the first mode, e.g., an angle greater than the second viewing angle but lesser than the first viewing angle, the second image IM2 may be visible to the user.

An operation of the second display part DA2 of the display device DD, for example, a switching operation between the first mode and the second mode, may be set by the user. For example, the user may toggle between first and second modes via a touch input on the display device or via a button. Alternatively, the first mode may be switched to the second mode when a specific application is executed. As an example, when an alarm pop-up with a risk of exposing personal information, such as a message, an incoming call screen, a deposit/withdrawal message, a security message, etc., is displayed on the second display part DA2, the operation mode of the second display part DA2 may be switched from the first mode to the second mode. In this way, the display device may hide sensitive information from potential viewers automatically. Accordingly, embodiments increase the privacy of users and improve the user experience by using the second display part DA2 as a personal image display area where the viewing angle is restricted.

According to an embodiment, a sensor area SA may overlap at least one sensor, such as first sensor SR1, second sensor SR2, or both first and second sensors SR1 and SR2. As an example, the sensor area SA may be an area through which the images are not displayed. In some embodiments, a transmittance of the sensor area SA may be higher than a transmittance of each of the first and second display parts DA1 and DA2.

Each of the sensors SR1 and SR2 may receive an external input through the sensing area SA or may output a signal through the sensing area SA. As an example, each of the sensors SR1 and SR2 may be a camera module, a sensor that measures a distance such as a proximity sensor, a sensor that recognizes a part of a user's body such as a fingerprint, an iris, or a face, a small lamp that outputs a light, an infrared projector or some combination thereof. However, the sensors SR1 and SR2 are not necessarily limited to these examples.

The second display part DA2 may surround the sensor area SA. The sensor area SA may have a variety of shapes. As an example, the sensor area SA may have a circular shape, an oval shape, a quadrangular shape, a rounded rectangular shape, or the like. FIG. 2 shows a structure in which the sensor area SA overlaps two sensors SR1 and SR2 as a representative example, though the present disclosure is not necessarily limited thereto. As an example, the sensor area SA may overlap one sensor.

Figure 3:
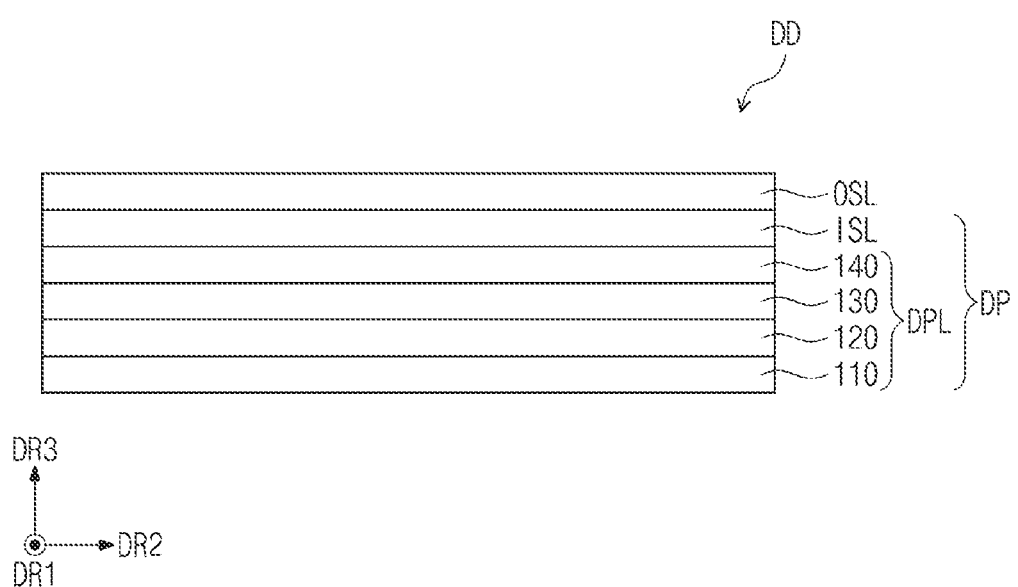
FIG. 3 is a cross-sectional view of a display device according to an embodiment of the present disclosure.

FIG. 3 is a cross-sectional view of the display device DD according to an embodiment of the present disclosure. Referring to FIG. 3, the display device DD may include a display panel DP and an optical path control layer OSL. A protective film, a window, or a functional coating layer may be further disposed on the optical path control layer OSL as a front surface of the display device DD.

The display panel DP may include a display layer DPL and a sensor layer ISL. The display layer DPL may include a base layer 110, a circuit layer 120, a light emitting element layer 130, and an encapsulation layer 140. The display layer DPL is configured to generate images. The display layer DPL may be a light emitting type display layer. For example, the display layer DPL may be an organic light emitting display layer, an inorganic light emitting display layer, an organic-inorganic light emitting display layer, a quantum dot display layer, a micro-LED display layer, or a nano-LED display layer.

The sensor layer ISL may sense an external input applied thereto from the outside. For example, the external input may be a user input. The user input may include a variety of forms of external inputs, such as a part of user's body, light, heat, pen, or pressure. The sensor layer ISL may be referred to as a sensor, an input sensor layer, or an input sensing panel. The sensor layer ISL may be formed on the display layer DPL through one or more manufacturing processes. For example, the sensor layer ISL may be formed onto the display player DPL through successive etching or photolithography processes, or may be formed separately and coupled to the display layer DPL. As an example, the sensor layer ISL may be coupled with the display layer DPL by an adhesive layer.

The optical path control layer OSL may control a path of the light provided from the display layer DPL. The optical path control layer OSL may include a structure to control the path of the light. The optical path control layer OSL may be disposed on the sensor layer ISL. In some embodiments, the optical path control layer OSL is formed together with the display layer DPL and the sensor layer ISL through successive processes, and is disposed directly on the sensor layer ISL. However, the formation of the optical path control layer OSL is not necessarily limited thereto. As an example, the optical path control layer OSL may be coupled with the sensor layer ISL by an adhesive layer.

Figure 4:
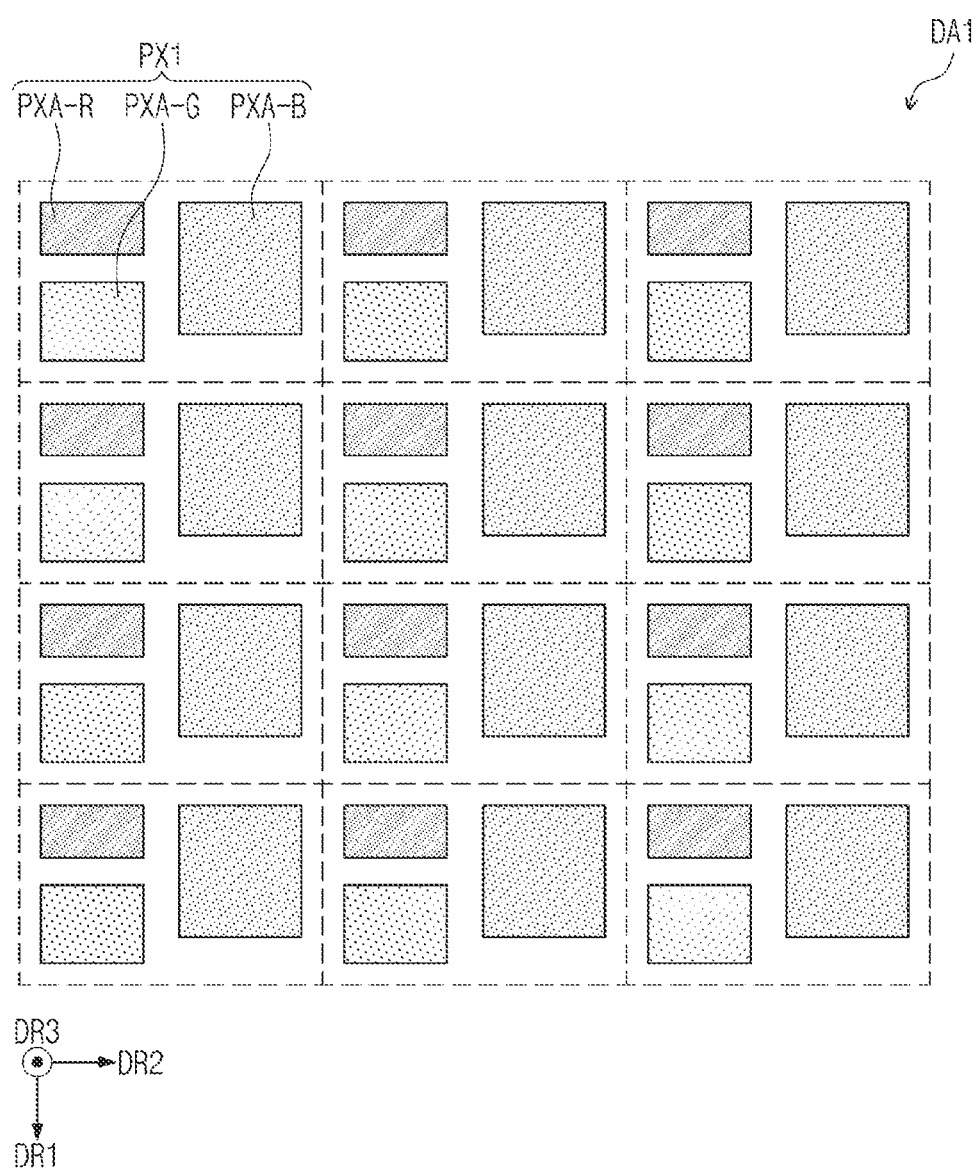
FIG. 4 is a plan view of a first display part according to an embodiment of the present disclosure.

FIG. 4 is a plan view of the first display part DA1 according to an embodiment of the present disclosure. Referring to FIG. 4, the first display part DA1 may include a plurality of first pixels PX1. FIG. 4 shows twelve first pixels PX1 arranged in the first direction DR1 and the second direction DR2. Each of the first pixels PX1 may include a plurality of light emitting areas PXA-R, PXA-G, and PXA-B. FIG. 4 shows a structure in which one first pixel PX1 includes three light emitting areas PXA-R, PXA-G, and PXA-B as a representative example, however, the present disclosure should not be particularly limited. As an example, one first pixel PX1 may include two or less light emitting areas or four or more light emitting areas.

The light emitting areas PXA-R, PXA-G, and PXA-B may include a first light emitting area PXA-R, a second light emitting area PXA-G, and a third light emitting area PXA-B. The first light emitting area PXA-R, the second light emitting area PXA-G, and the third light emitting area PXA-B may display lights of different wavelengths. The first light emitting area PXA-R may display a first light with a red wavelength, the second light emitting area PXA-G may display a second light with a green wavelength, and the third light emitting area PXA-B may display a third light with a blue wavelength.

The first, second, and third light emitting areas PXA-R, PXA-G, and PXA-B may have different sizes depending on the wavelengths of the lights emitted therefrom. As an example, as shown in FIG. 4, the third light emitting area PXA-B emitting the blue light may have the largest size, and the first light emitting area PXA-R emitting the red light may have the smallest size. However, the present disclosure is not necessarily limited thereto, and the first, second, and third light emitting areas PXA-R, PXA-G, and PXA-B may have substantially the same size as each other, or the first, second, and third light emitting areas PXA-R, PXA-G, and PXA-B may be defined with size ratios different from those shown in FIG. 4. The first, second, and third light emitting areas PXA-R, PXA-G, and PXA-B may emit lights with colors different from the red wavelength, the green wavelength, and the blue wavelength described above.

The shape and arrangement of the first, second, and third light emitting areas PXA-R, PXA-G, and PXA-B is not necessarily limited to those shown in FIG. 4. As an example, each of the first, second, and third light emitting areas PXA-R, PXA-G, and PXA-B may have a variety of shapes, such as a lozenge shape, a circular shape, an oval shape, a triangular shape, a quadrangular shape with rounded vertices, or an irregular shape when viewed in a plane.

Figure 5:
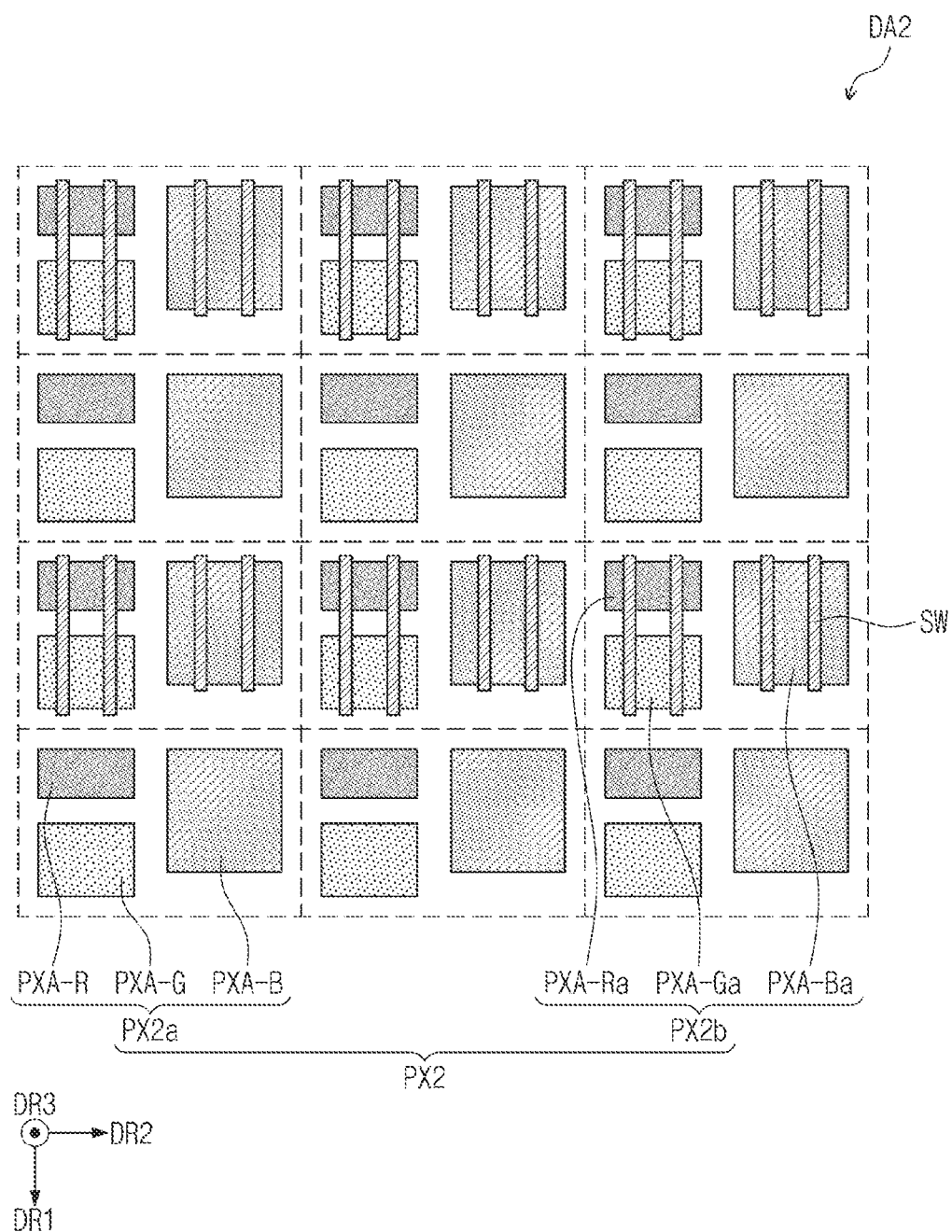
FIG. 5 is a plan view of a second display part according to an embodiment of the present disclosure.

FIG. 5 is a plan view of the second display part DA2 according to an embodiment of the present disclosure.

Referring to FIGS. 4 and 5, the second display part DA2 may include a plurality of second pixels PX2. FIG. 5 shows twelve second pixels PX2 arranged in the first direction DR1 and the second direction DR2 as a representative example.

The second pixels PX2 may include first type pixels PX2*a* and second type pixels PX2*b*. The images displayed through the first type pixels PX2*a* may have the first viewing angle, and the images displayed through the second type pixels PX2*b* may have the second viewing angle. The second viewing angle may be smaller (e.g., narrower) than the first viewing angle. As an example, the first type pixels PX2*a* may have substantially the same structure as the first pixels PX1 included in the first display part DA1. For example, the images displayed through the first display part DA1 may have the first viewing angle.

Both the first type pixels PX2*a* and the second type pixels PX2*b* may be arranged in the second direction DR2. The first type pixels PX2*a* may be alternately arranged with the second type pixels PX2*b* in the first direction DR1. However, this is merely an example, and arrangements of the first type pixels PX2*a* and the second type pixels PX2*b* is not necessarily limited thereto. For example, the first type pixels PX2*a* may be alternately arranged with the second type pixels PX2*b* in the second direction DR2.

Each of the first type pixels PX2*a* may include a first light emitting area PXA-R, a second light emitting area PXA-G, and a third light emitting area PXA-B. Each of the second type pixels PX2*b* may include a first light emitting area PXA-Ra, a second light emitting area PXA-Ga, a third light emitting area PXA-Ba, and a barrier wall SW. The barrier wall SW may overlap each of the first, second, and third light emitting areas PXA-Ra, PXA-Ga, and PXA-Ba. For example, the barrier wall SW may overlap each of the first, second, and third light emitting areas PXA-Ra, PXA-Ga, and PXA-Ba when viewed in a plan view. The barrier wall SW may control paths of the light emitted from the first, second, and third light emitting areas PXA-Ra, PXA-Ga, and PXA-Ba.

When the second display part DA2 operates in the second mode, the first type pixels PX2*a* may not operate, and only the second type pixels PX2*b* may operate. The path of the light produced by the first type pixels PX2*a* may be controlled via the barrier wall SW, such that the resultant image generated by the first type pixels PX2*a* has a relatively narrow viewing angle. Accordingly, the image displayed through the second display part DA2 may have the restricted viewing angle. As an example, in FIG. 5, only pixels arranged in an odd-numbered row may operate, and pixels arranged in an even-numbered row may not operate.

According to the present embodiment, a resolution of the image displayed through the second display part DA2 may be lower than a resolution of the image displayed through the first display part DA1 in the second mode. For example, in the second mode, the images displayed through the second display part DA2 may have a lower pixel density than images displayed through the first display part DA1. In addition, the resolution of the image displayed through the second display part DA2 in the second mode may be smaller than the resolution of the image displayed through the second display part DA2 in the first mode. For example, in the second mode, the images displayed through the second display part DA2 may be scaled down with reference to images displayed through the first display part DA1 to accommodate fewer pixels in the second display part DA2 than are available in the first mode.

As an example, in the case where the second display part DA2 operates in the first mode, both the first type pixels PX2*a* and the second type pixels PX2*b* may operate. As an example, all the pixels arranged in the odd-numbered row and the pixels arranged in the even-numbered row may operate in FIG. 5. Accordingly, in this case, more pixels may operate in the first mode than in the second mode, and the resolution of the image displayed through the second display part DA2 in the second mode may be smaller than the resolution of the image displayed through the second display part DA2 in the first mode.

In another example, in a case where the second display part DA2 operates in the first mode, only the first type pixels PX2*a* may operate. As an example, in FIG. 5, only the pixels arranged in the even-numbered row may operate, and the pixels arranged in the odd-numbered row may not operate. In this case, the same or similar number of pixels may operate in the first mode and in the second mode, and the resolution of the image displayed through the second display part DA2 in the second mode may be substantially the same as the resolution of the image displayed through the second display part DA2 in the first mode.

Figure 6A:
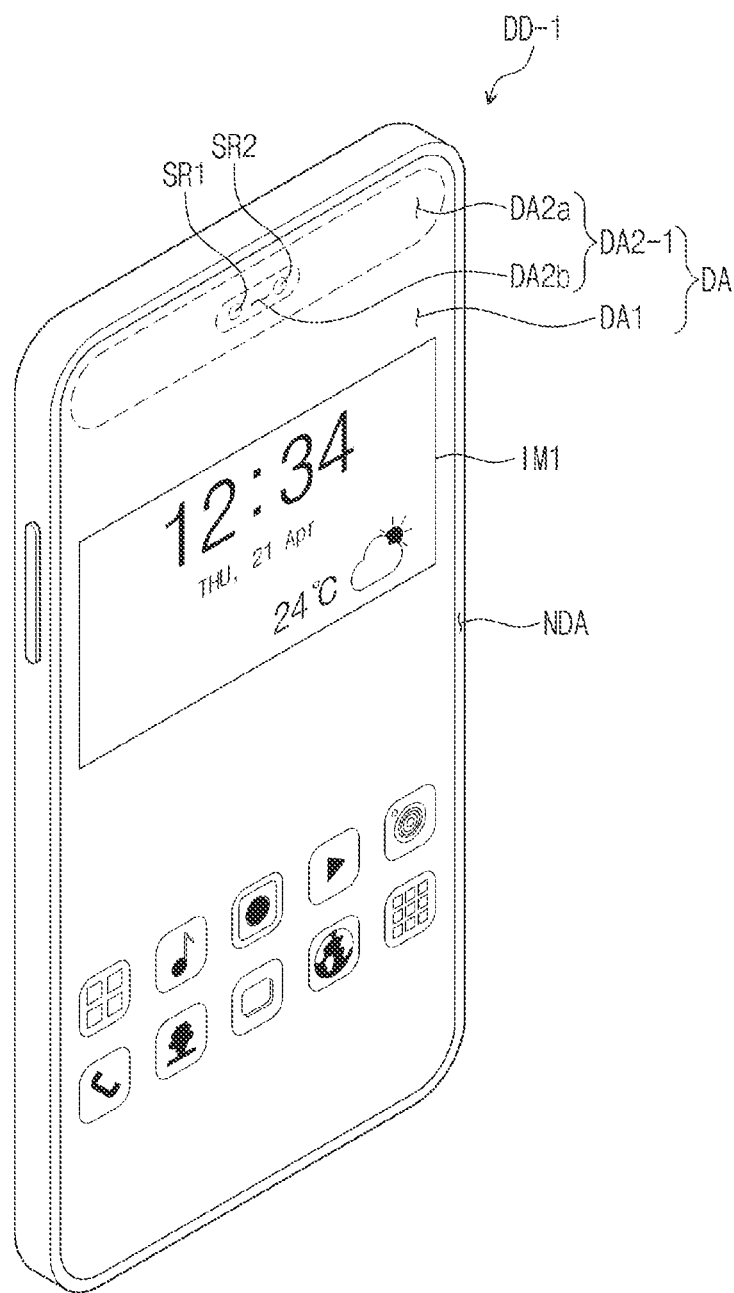
FIG. 6A is a perspective view of a display device according to an embodiment of the present disclosure.

FIG. 6A is a perspective view of a display device DD-1 according to an embodiment of the present disclosure. Referring to FIGS. 1 and 6A, a display area DA may include a first display part DA1 and a second display part DA2-1.

The second display part DA2-1 may include a first sub-display part DA2*a* and a second sub-display part DA2*b*. The first sub-display part DA2*a* may surround the second sub-display part DA2*b*, though embodiments are not necessarily limited thereto. As an example, the second sub-display part DA2*b* may be adjacent to a non-display area NDA, and the first sub-display part DA2*a* may be provided to surround at least a portion of the second sub-display part DA2*b*.

The second sub-display part DA2*b* may overlap at least one sensor, such as first sensor SR1, second sensor SR2, or a combination thereof. The second sub-display part DA2*b* may have a transmittance higher than a transmittance of the first sub-display part DA2*a* and a transmittance of the first display part DA1.

The first display part DA1 may display a first image IM1, and the second display part DA2-1 may display a second image IM2. The second display part DA2-1 may selectively operate in the first mode or the second mode. For example, a user may toggle between the first mode or the second mode, or the display device DD-1 may automatically choose between the first mode or the second mode according to, e.g., logic from an application. As an example, in a case where the second display part DA2-1 operates in the second mode, the second image IM2 shown in FIG. 1 may not be viewed at an angle shown in FIG. 6A.

According to an embodiment, the first display part DA1 may include first pixels PX1 as shown in FIG. 4. The first sub-display part DA2*a* may include second pixels PX2 as shown in FIG. 5. The second sub-display part DA2*b* will be described in detail with reference to FIGS. 7 and 8.

Figure 6B:
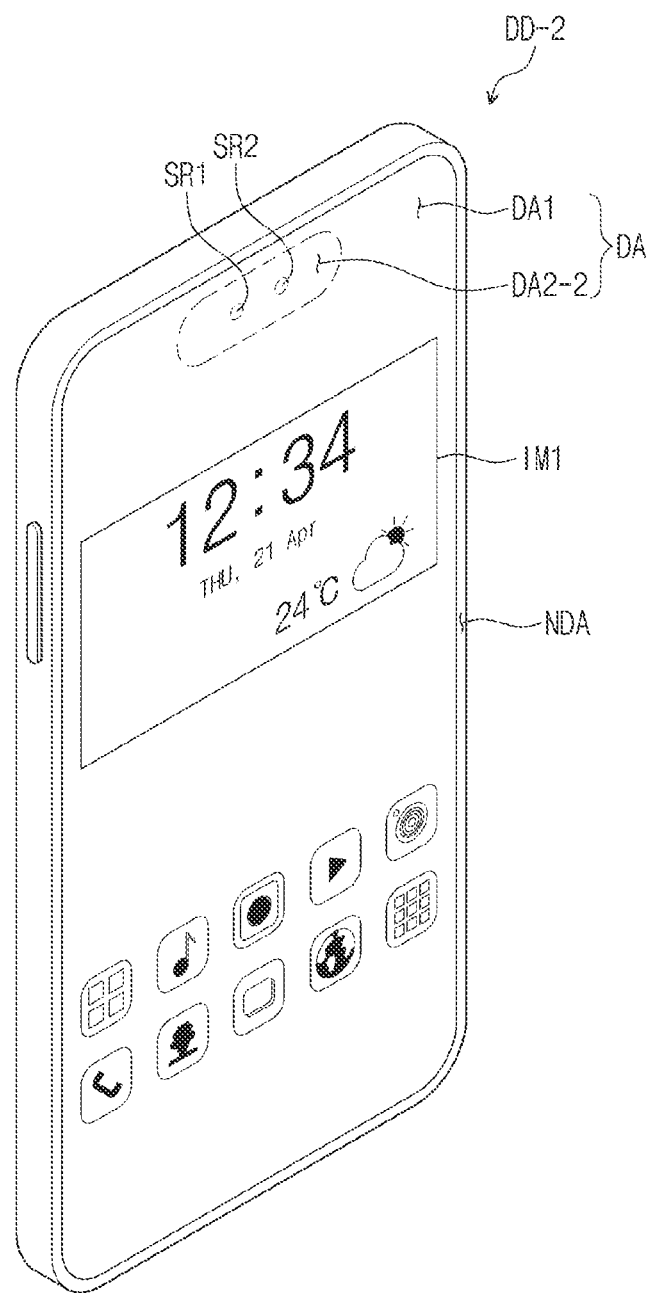
FIG. 6B is a perspective view of a display device according to an embodiment of the present disclosure.

FIG. 6B is a perspective view of a display device DD-2 according to an embodiment of the present disclosure. Referring to FIGS. 1 and 6B, a display area DA may include a first display part DA1 and a second display part DA2-2. The second display part DA2-2 may overlap at least one sensor, such as first sensor SR1, second sensor SR2 or a combination thereof. The second display part DA2-2 may have a transmittance higher than a transmittance of the first display part DA1.

The first display part DA1 may display a first image IM1, and the second display part DA2-2 may display a second image IM2. The second display part DA2-2 may selectively operate in the first mode or the second mode. As an example, in a case where the second display part DA2-2 operates in the second mode, the second image IM2 shown in FIG. 1 may not be viewed at an angle shown in FIG. 6B. For example, the angle and orientation of the display device DD-2 shown in FIG. 6B may simulate an angle from which an unintended user looks upon display device DD-2.

According to an embodiment, the first display part DA1 may include first pixels PX1 as shown in FIG. 4. The second display part DA2-2 will be described in detail with reference to FIGS. 7 and 8.

Figure 7:
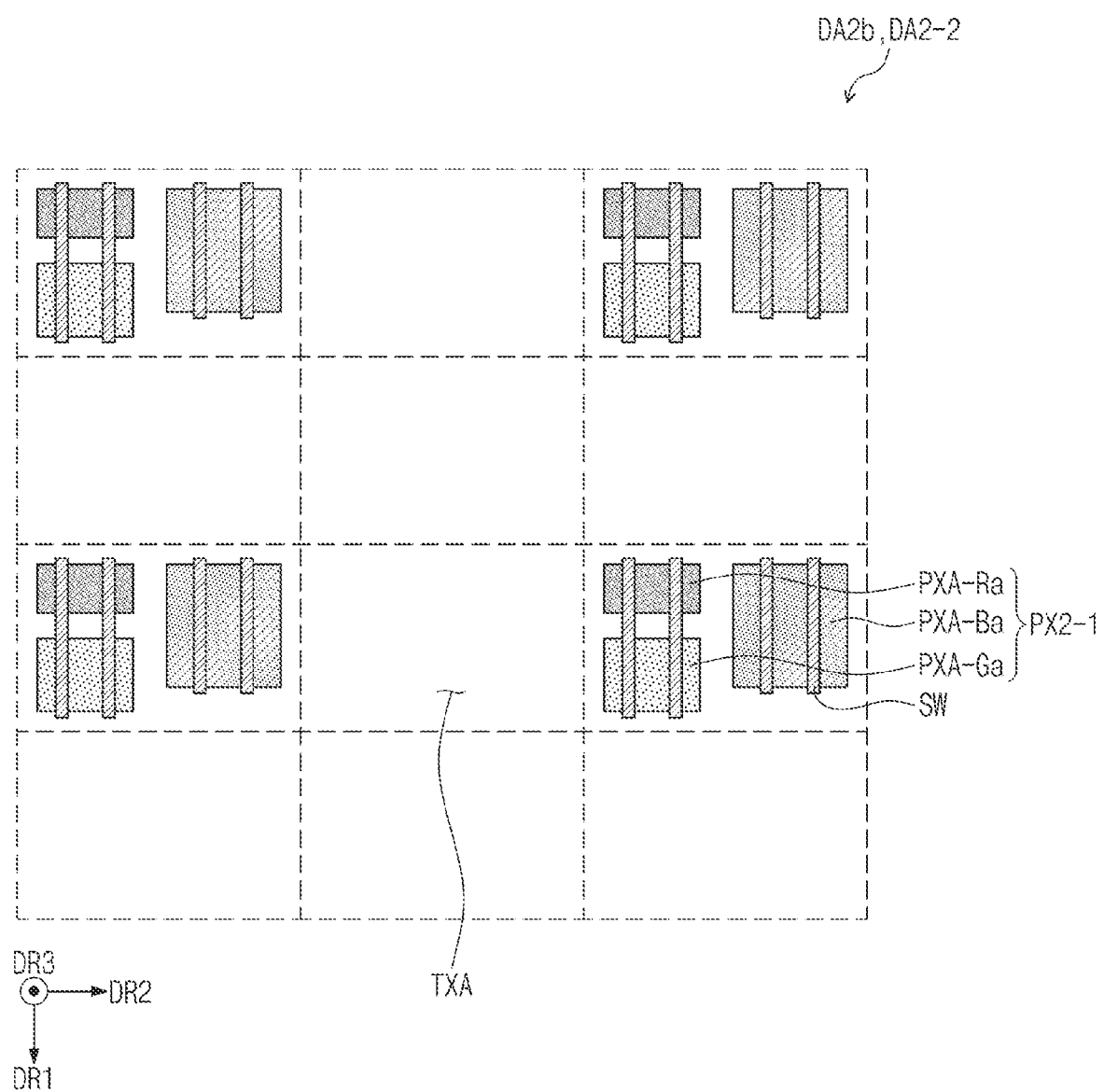
FIG. 7 is a plan view of a second display part according to an embodiment of the present disclosure.

FIG. 7 is a plan view of the second sub-display part DA2b of FIG. 6A and the second display part DA-2 of FIG. 6B according to an embodiment of the present disclosure.

Referring to FIG. 7, the second sub-display part DA2b or the second display part DA2-2 may include second pixels PX2-1. A pixel density of the second pixels PX2-1 may be lower than a pixel density of the first pixels PX1 (e.g., as illustrated in FIG. 4). A transmission area TXA may be defined in an area where the second pixels PX2-1 are not arranged.

Each of the second pixels PX2-1 may include a first light emitting area PXA-Ra, a second light emitting area PXA-Ga, a third light emitting area PXA-Ba, and a barrier wall SW. The barrier wall SW may overlap each of the first, second, and third light emitting areas PXA-Ra, PXA-Ga, and PXA-Ba in a plan view. The barrier wall SW may limit paths of lights emitted from the first, second, and third light emitting areas PXA-Ra, PXA-Ga, and PXA-Ba. For example, the barrier wall SW may narrow the viewing angle of the light produced from the first, second, and third light emitting areas PXA-Ra, PXA-Ga, and PXA-Ba.

The second sub-display part DA2b or the second display part DA2-2 may include only the second pixels PX2-1 where the viewing angle is restricted. Accordingly, in contrast with the embodiment shown in FIG. 5, each of the second sub-display part DA2b and the second display part DA2-2 may operate in the second mode in the embodiment shown in FIG. 7.

The second sub-display part DA2b or the second display part DA2-2 may correspond to an area that overlaps the sensors SR1 and SR2 (e.g., as illustrated in FIG. 6A or FIG. 6B). As the second pixels PX2-1 are arranged in the second sub-display part DA2b and the second display part DA2-2, the second sub-display part DA2b and the second display part DA2-2 may be used as an area to display sensitive information, such an alarm pop-up with a risk of exposing personal information, a message, an incoming call notification, a deposit/withdrawal message, a security message, etc.

Figure 8:
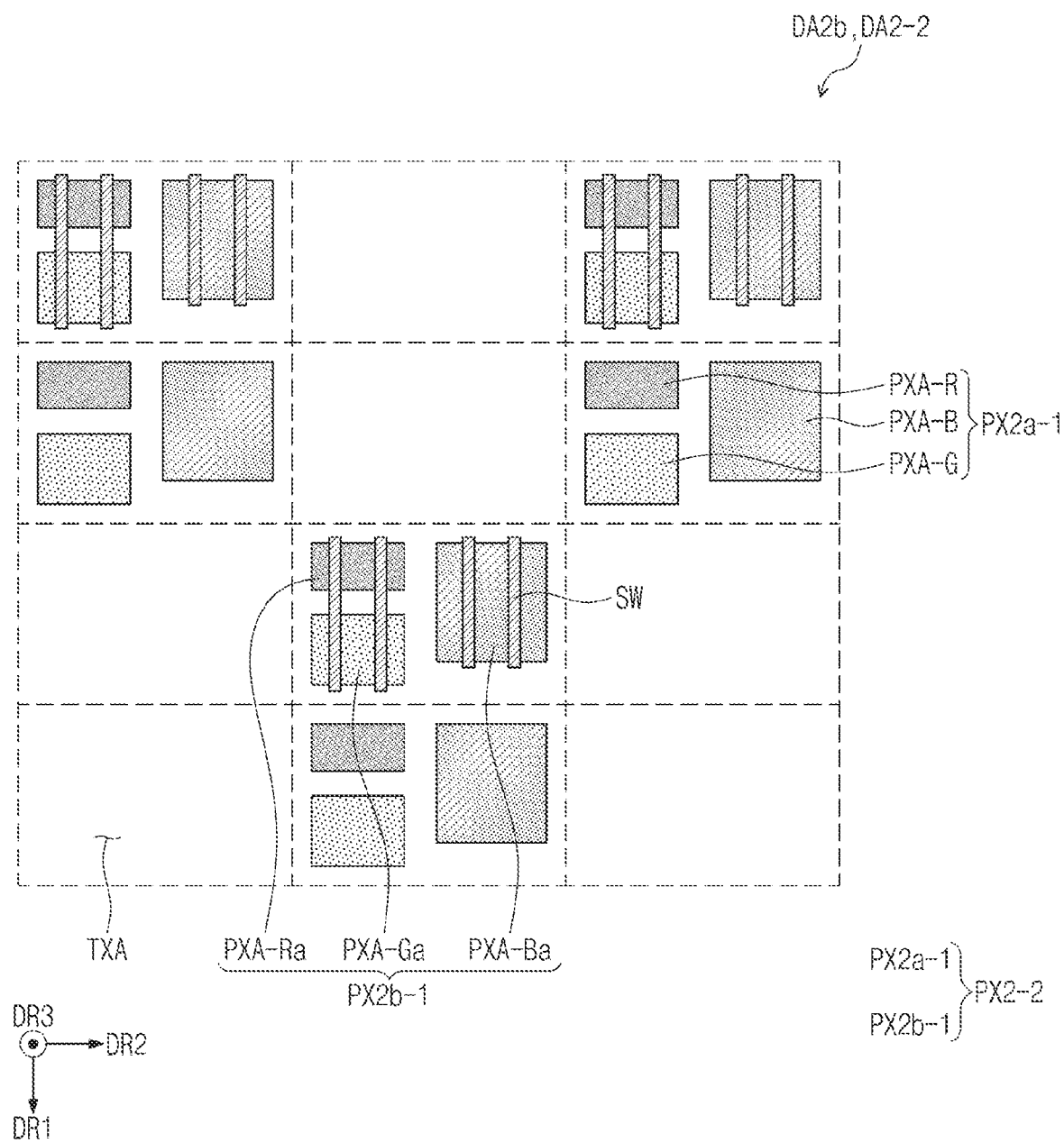
FIG. 8 is a plan view of a second display part according to an embodiment of the present disclosure.

FIG. 8 is a plan view of a second sub-display part DA2b or a second display part DA2-2 according to an embodiment of the present disclosure. Referring to FIG. 8, a second sub-display part DA2b or a second display part DA2-2 may include second pixels PX2-2. A pixel density of the second pixels PX2-2 may be lower than a pixel density of the first pixels PX1 (e.g., as illustrated in FIG. 4). As an example, a transmission area TXA may be defined in an area where the second pixels PX2-2 are arranged.

According to the present embodiment, the second pixels PX2-2 may include first type pixels PX2a-1 and second type pixels PX2b-1. Images displayed through the first type pixels PX2a-1 may have a first viewing angle, and images displayed through the second type pixels PX2b-1 may have a second viewing angle. The second viewing angle may be smaller (e.g., narrower) than the first viewing angle. As an example, the first type pixels PX2a-1 may have substantially the same structure as the first pixels PX1 included in the first display part DA1 (e.g., as illustrated in FIG. 1).

According to the present embodiment, when the second sub-display part DA2b or the second display part DA2-2 operates in the second mode, the first type pixels PX2a-1 may not operate, and only the second type pixels PX2b-1 may operate. Accordingly, the images displayed through the second sub-display part DA2b or the second display part DA2-2 may have a restricted viewing angle.

According to the present embodiment, when the second sub-display part DA2b or the second display part DA2-2 operates in the first mode, both the first type pixels PX2a-1 and the second type pixels PX2b-1 may operate. In a case where the second sub-display part DA2b or the second display part DA2-2 operate in the first mode, only the first type pixels PX2a-1 may operate.

Figure 9:
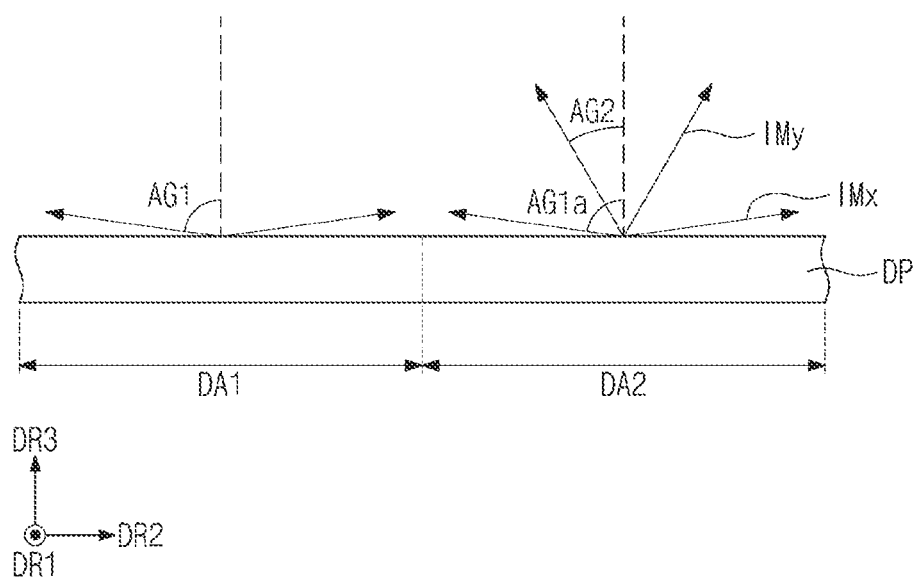
FIG. 9 is a cross-sectional view of a display panel according to an embodiment of the present disclosure.

FIG. 9 is a cross-sectional view of a display panel DP according to an embodiment of the present disclosure. Referring to FIG. 9, a display panel DP may include a first display part DA1 and a second display part DA2. The first display part DA1 may display an image at a first viewing angle AG1, and the second display part DA2 may display an image at a first viewing angle AG1a or a second viewing angle AG2. The first viewing angle AG1 of the first display part DA1 may be substantially the same as the first viewing angle AG1a of the second display part DA2.

According to an embodiment, when the second display part DA2 operates in a first mode, both an image IMx having the first viewing angle AG1a and an image IMy having the second viewing angle AG2 may be displayed. In another example, when the second display part DA2 operates in the first mode, only the image IMx having the first viewing angle AG1a may be displayed. However, when the second display part DA2 operates in a second mode, only the image IMy having the second viewing angle AG2 that is narrower with respect to the first viewing angle AG1a may be displayed.

Figure 10A:
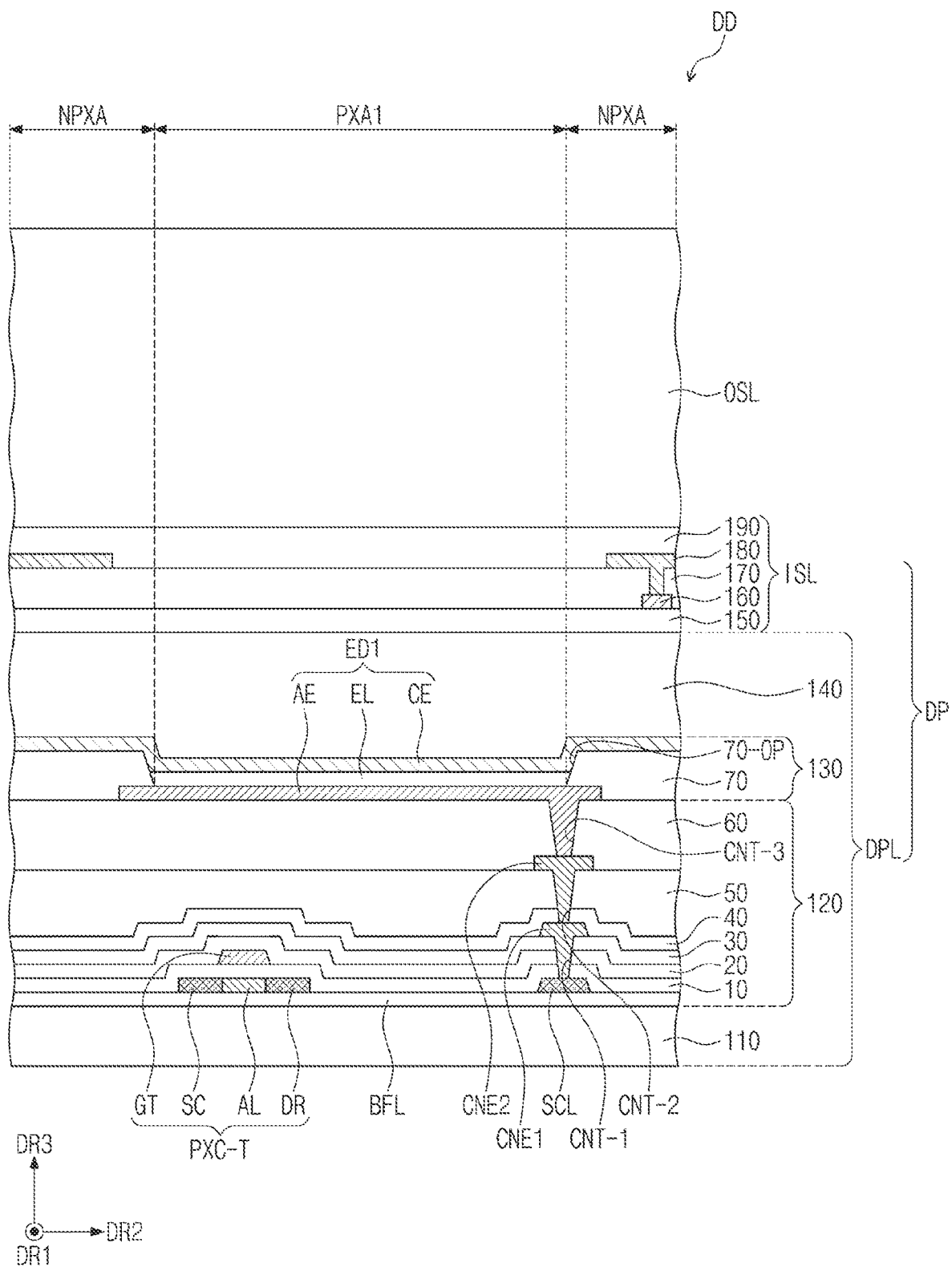
FIG. 10A is a cross-sectional view of a display device according to an embodiment of the present disclosure.
Figure 10B:
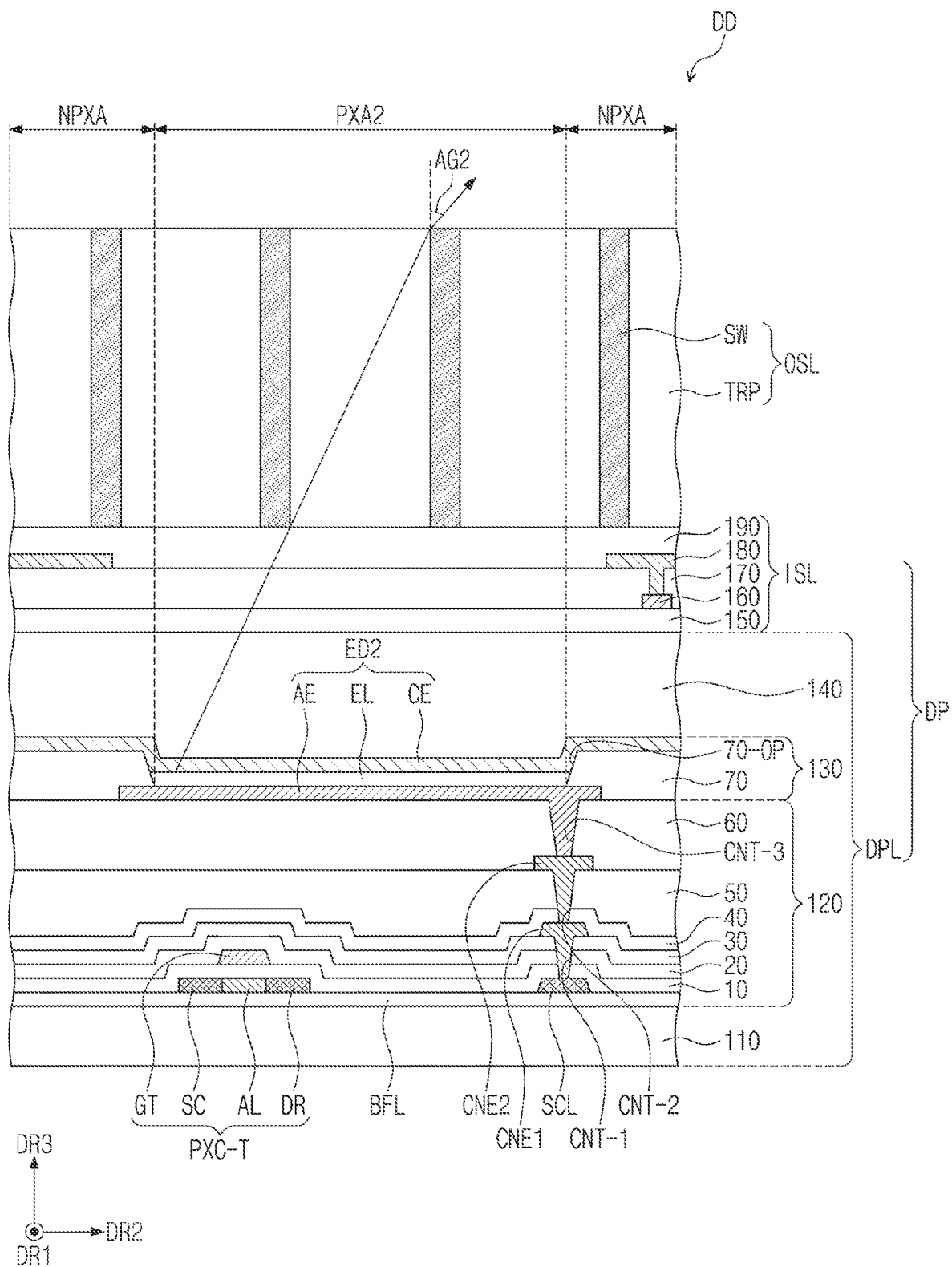
FIG. 10B is a cross-sectional view of a display device according to an embodiment of the present disclosure.

FIG. 10A is a cross-sectional view of the display device DD according to an embodiment of the present disclosure. FIG. 10B is a cross-sectional view of the display device DD according to an embodiment of the present disclosure. Particularly, FIG. 10A is a cross-sectional view of the first display part DA1 (e.g., as illustrated in FIG. 1), and FIG. 10B is a cross-sectional view of the second display part DA2 (e.g., as illustrated in FIG. 1).

Referring to FIGS. 10A and 10B, the display layer DPL may include a base layer 110, a circuit layer 120, a light emitting element layer 130, and an encapsulation layer 140. The base layer 110 may be a member that provides a base surface on which the circuit layer 120 is disposed. The base layer 110 may include a synthetic resin layer. The synthetic resin layer may include a polyimide-based resin, however, embodiments are not necessarily limited thereto. The base layer 110 may be a glass substrate, a metal substrate, or an organic-inorganic composite material substrate.

One or more inorganic layers may be formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed in multiple layers. The inorganic layers may form a barrier layer and/or a buffer layer. In the present embodiment, the display layer DPL may include a buffer layer BFL.

The buffer layer BFL may increase a coupling force between the base layer 110 and a semiconductor pattern. The buffer layer BFL may include silicon oxide, silicon nitride, silicon oxynitride, or a combination thereof. For example, the buffer layer BFL may have a structure in which the silicon oxide layer and the silicon nitride layer are alternately stacked with each other.

The semiconductor pattern may be disposed on the buffer layer BFL. The semiconductor pattern may include polysilicon, however, embodiments are not necessarily limited thereto. The semiconductor pattern may include amorphous silicon, low temperature polycrystalline silicon, or an oxide semiconductor.

FIGS. 10A and 10B show only a portion of the semiconductor pattern, and the semiconductor pattern may be further disposed in other areas. The semiconductor pattern may be arranged in a particular configuration with respect to the pixels. For example, the arrangement of the elements in the semiconductor pattern may define pixel regions. The semiconductor pattern may have different electrical properties depending on whether or not it is doped or whether it is doped with an N-type dopant or a P-type dopant. The semiconductor pattern may include a first region having a relatively high conductivity and a second region having a relatively low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or a region doped at a concentration lower than that of the first region.

The first region may have a conductivity greater than that of the second region. The first region may function as an electrode or signal line. The second region may correspond to an active area (or a channel) of the transistor. In other words, a portion of the semiconductor pattern may be the active area of the transistor, another portion of the semiconductor pattern may be a source area or a drain area of the transistor, and the other portion of the semiconductor pattern may be a connection electrode or a connection signal line.

FIGS. 10A and 10B show one transistor PXC-T and one light emitting element ED1 or ED2 included in the pixel. A source area SC, an active area (or an active) AL, and a drain area DR of the transistor PXC-T may be formed from the semiconductor pattern. The source area SC and the drain area DR may extend in opposite directions to each other from the active area AL when viewed in a cross-section. FIGS. 10A and 10B show a portion of a connection signal line SCL formed from the semiconductor pattern. The connection signal line SCL may be connected to the drain area DR of the transistor PXC-T in a plane.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer and may have a single-layer or multi-layer structure. The first insulating layer 10 may include aluminum oxide, titanium oxide, silicon oxide, silicon nitride, silicon oxynitride, zirconium oxide, hafnium oxide, or a combination thereof. In the present embodiment, the first insulating layer 10 may have a single-layer structure of a silicon oxide layer. Not only the first insulating layer 10, but also an insulating layer of the circuit layer 120 described later may be an inorganic layer and/or an organic layer and may have a single-layer or multi-layer structure. The inorganic layer may include at least one of the above-mentioned materials, however, embodiments are not necessarily limited thereto.

A gate electrode GT of the transistor PXC-T may be disposed on the first insulating layer 10. The gate electrode GT may be a portion of a metal pattern. The gate electrode GT may overlap the active area AL. The gate electrode GT may be used as a mask in a process of doping the semiconductor pattern.

A second insulating layer 20 may be disposed on the first insulating layer 10 and may cover the gate electrode GT. The second insulating layer 20 may commonly overlap the pixels. The second insulating layer 20 may be an inorganic layer and/or an organic layer and may have a single-layer or multi-layer structure. The second insulating layer 20 may include silicon oxide, silicon nitride, silicon oxynitride, or a combination thereof. In the present embodiment, the second insulating layer 20 may have a multi-layer structure and may include a silicon oxide layer and a silicon nitride layer.

A third insulating layer 30 may be disposed on the second insulating layer 20. The third insulating layer 30 may have a single-layer or multi-layer structure. In the present embodiment, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 defined through the first, second, and third insulating layers 10, 20, and 30.

A fourth insulating layer 40 may be disposed on the third insulating layer 30. The fourth insulating layer 40 may have a single-layer structure, and may include a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The stacked configuration of the layers of the circuit layer 120 shown in FIGS. 10A and 10B is provided as an example and embodiments are not necessarily limited thereto. As an example, one of the first, second, third, fourth, fifth, and sixth insulation layers 10, 20, 30, 40, 50, and 60 may be omitted, or other insulating layers may be added.

The light emitting element layer 130 may be disposed on the circuit layer 120. The light emitting element layer 130 may include light emitting elements ED1 and ED2. The light emitting element layer 130 may include an organic light emitting material, an inorganic light emitting material, an organic-inorganic light emitting material, a quantum dot, a quantum rod, a micro-LED, or a nano-LED. Hereinafter, the organic light emitting element will be described as the light emitting elements ED1 and ED2, however, embodiments are not necessarily limited thereto.

Each of the light emitting elements ED1 and ED2 may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The display area DA (e.g., as illustrated in FIG. 1) may include light emitting areas PXA1 and PXA2 and a non-light-emitting area NPXA. The non-light-emitting area NPXA may be disposed adjacent to the light emitting areas PXA1 and PXA2. The non-light-emitting area NPXA may surround each of the light emitting area PXA, e.g., in a plan view. In the present embodiment, the light emitting areas PXA1 and PXA2 may be defined as the area overlapping the portion of the first electrode AE that is exposed through the opening 70-OP. The light emitting areas PXA1 and PXA2 may include a first light emitting area PXA1 and a second light emitting area PXA2. The first light emitting area PXA1 may be one of the first, second, and third light emitting areas PXA-R, PXA-G, and PXA-B shown in FIG. 4 or 5, and the second light emitting area PXA2 may be one first, second, and third light emitting areas PXA-Ra, PXA-Ga, and PXA-Ba shown in FIG. 5.

The light emitting layer EL may be disposed on the first electrode AE. The light emitting layer EL may be disposed in an area corresponding to the opening 70-OP. For example, the light emitting layer EL may be formed in each of the pixels after being divided into plural portions. When the light emitting layer EL is formed in each of the pixels after being divided into plural portions, each of the light emitting layers EL may emit a light having at least one of blue, red, and green colors, however, embodiments are not necessarily limited thereto. The light emitting layer EL may be integrally formed and common to the pixels. In this case, the light emitting layer EL may provide a blue light or a white light. The second electrode CE may be disposed on the light emitting layer EL. The second electrode CE may have an integral shape and may be commonly disposed over the pixels.

In some embodiments, a hole control layer may be disposed between the first electrode AE and the light emitting layer EL. The hole control layer may be commonly disposed in the light emitting areas PXA1 and PXA2 and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. Each of the hole control layer and the electron control layer may be commonly formed in the plural pixels using an open mask.

The encapsulation layer 140 may be disposed on the light emitting element layer 130. The encapsulation layer 140 may have a stacked structure and include an inorganic layer, an organic layer, and an inorganic layer, sequentially stacked on one another. However, embodiments of the encapsulation layer 140 are not necessarily limited thereto.

The inorganic layers may protect the light emitting element layer 130 from moisture and oxygen, and the organic layer may protect the light emitting element layer 130 from a foreign substance such as dust particles. The inorganic layers may include a silicon nitride layer, a silicon oxynitride layer, a silicon oxide layer, a titanium oxide layer, or an aluminum oxide layer. The organic layer may include an acrylic-based organic layer, however, embodiments are not necessarily limited thereto.

The sensor layer ISL may include a base layer 150, a first conductive layer 160, a sensing insulating layer 170, a second conductive layer 180, and a cover insulating layer 190. The base layer 150 may be an inorganic layer and include silicon nitride, silicon oxynitride, silicon oxide, or a combination thereof. In some embodiments, the base layer 150 is an organic layer including an epoxy-based resin, an acrylic-based resin, or an imide-based resin. The base layer 150 may have a single-layer structure or a multi-layer structure of layers stacked in the third direction DR3.

The first conductive layer 160 and the second conductive layer 180 may each have a single-layer structure or a multi-layer structure of layers stacked in the third direction DR3. A conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (ITZO), or the like. In addition, the transparent conductive layer may include conductive polymer such as PEDOT, metal nanowire, graphene, or the like.

A conductive layer having the multi-layer structure may include metal layers. The metal layers may have a three-layer structure of titanium/aluminum/titanium. The conductive layer having the multi-layer structure may include one or more metal layers and one or more transparent conductive layers.

At least one of the sensing insulating layer 170 and the cover insulating layer 190 may include an inorganic layer. The inorganic layer may include aluminum oxide, titanium oxide, silicon oxide, silicon nitride, silicon oxynitride, zirconium oxide, hafnium oxide, or a combination thereof.

The sensing insulating layer 170 or the cover insulating layer 190 may include an organic layer. The organic layer may include an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, a perylene-based resin, or a combination thereof.

The optical path control layer OSL may include a plurality of barrier walls SW and a transparent portion TRP disposed between the barrier walls SW. The barrier walls SW may include a light absorbing material or a light blocking material. As an example, a light incident into the barrier walls SW may be absorbed by the barrier walls SW without being reflected. The transparent portion TRP may include a transparent organic material.

FIG. 10B shows a structure in which each of the barrier walls SW has a quadrangular shape when viewed in a cross-section. This is as a representative example, however, the shape of the barrier walls SW is not necessarily limited thereto. As an example, each of the barrier walls SW may have a variety of shapes such as a trapezoidal shape or an inverted trapezoidal shape.

In the present embodiment, the first light emitting area PXA1 (e.g., as illustrated in FIG. 10A) does not overlap the barrier walls SW, and the second light emitting area PXA2 (e.g., as illustrated in FIG. 10B) overlaps the barrier walls SW. Accordingly, in this embodiment, the light provided from the first light emitting area PXA1 is not constrained to a narrow viewing angle, a path of the light provided from the second light emitting area PXA2 is constrained to a narrow viewing angle by the barrier walls SW. Accordingly, a light emission of the first light emitting area PXA1 and the second light emitting area PXA2 may be limited in a portion of the display device DD (e.g., as illustrated in FIG. 1). Accordingly, an image displayed through the portion of the display device DD (e.g., as illustrated in FIG. 1) may be displayed at various viewing angles. Accordingly, user privacy may be increased and the user experience may be improved.

FIGS. 10A and 10B show an example structure used to restrict the viewing angle, however, the structure used to restrict the viewing angle may vary according to different embodiments. As an example, the optical path control layer OSL may be disposed between the display layer DPL and the sensor layer ISL or may be embedded within the display layer DPL. According to an embodiment, the optical path control layer OSL may be omitted, and in this case, a layer to block a light may be added to an area adjacent to the second light emitting area PXA2. According to an embodiment, a layer or film to control the viewing angle may be provided to only an area overlapping the second light emitting area PXA2.

Figure 11A:
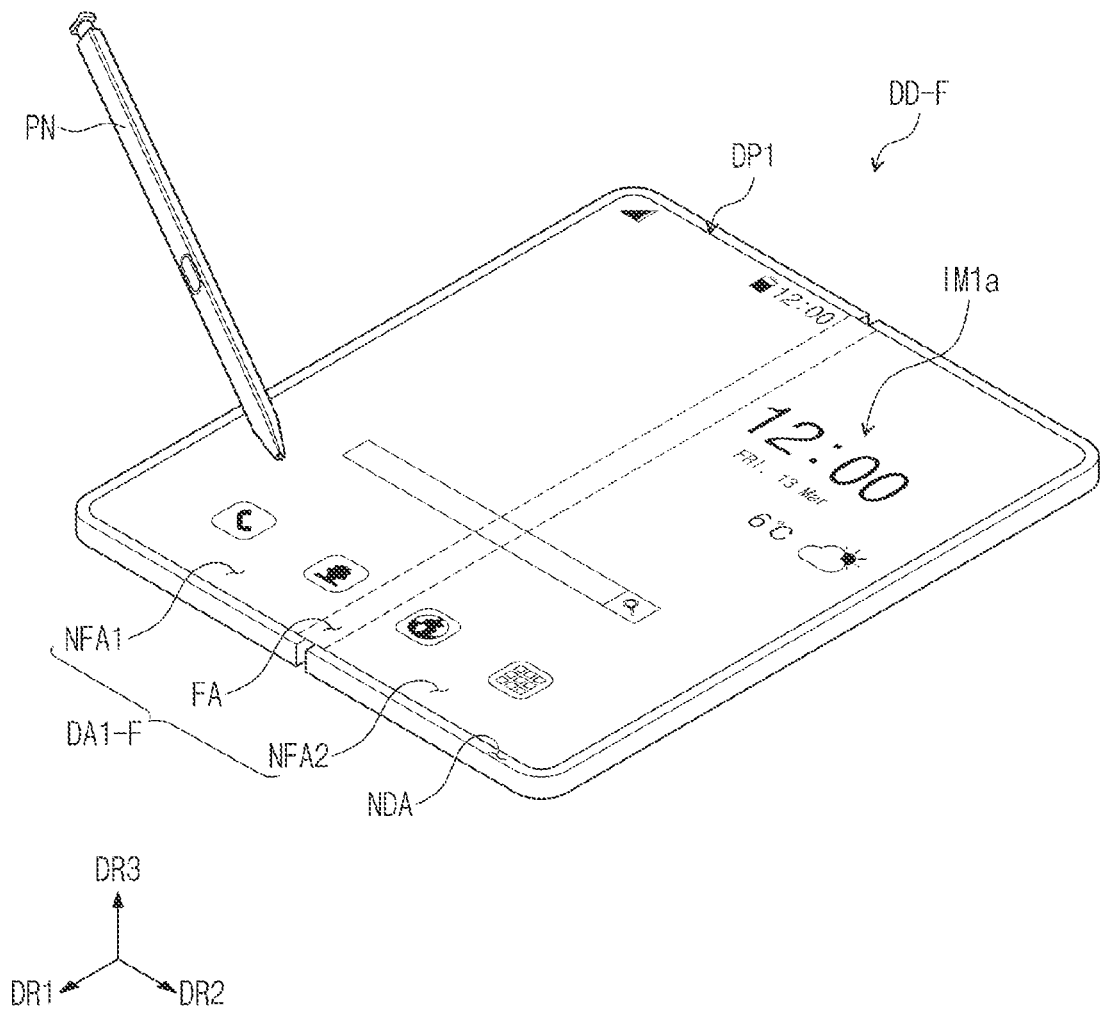
FIG. 11A is a perspective view of a display device according to an embodiment of the present disclosure.
Figure 11B:
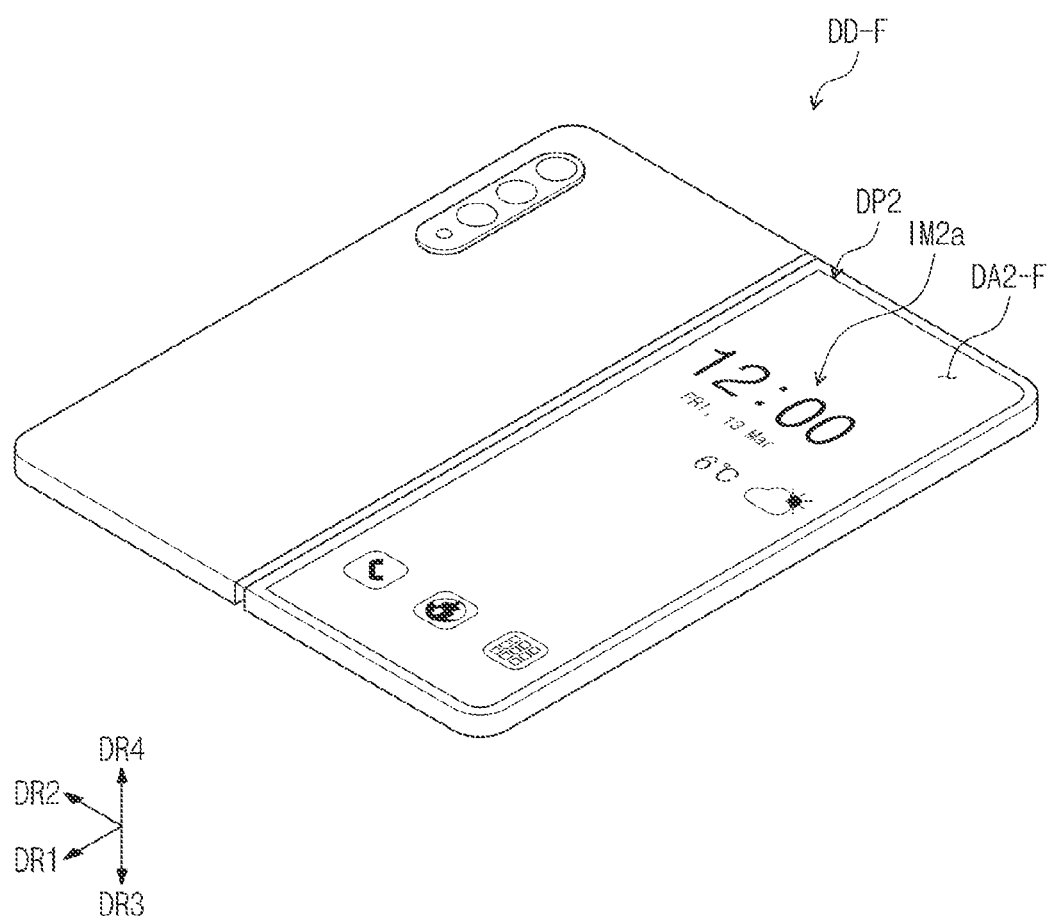
FIG. 11B is a perspective view of a display device according to an embodiment of the present disclosure.

FIG. 11A is a perspective view of a display device DD-F according to an embodiment of the present disclosure, and FIG. 11B is a perspective view of the display device DD-F according to an embodiment of the present disclosure.

Referring to FIGS. 11A and 11B, the display device DD-F may be operated in response to electrical signals. As an example, the display device DD-F may display an image and may sense external inputs applied thereto from the outside. The external input may be a user input. For example, a user may provide user input via a variety of modalities such as through touch using a part of user's body, a pen PN, light, heat, or pressure.

The display device DD-F may include a first display panel DP1 and a second display panel DP2. The first display panel DP1 and the second display panel DP2 may be separated from each other. The first display panel DP1 may be referred to as a main display panel, and the second display panel DP2 may be referred to as an auxiliary display panel or an external display panel. The second display panel DP2 may have a size smaller than a size of the first display panel DP1.

The first display panel DP1 may include a first display part DA1-F, and the second display panel DP2 may include a second display part DA2-F. The first display part DA1-F may have a size greater than a size of the second display part DA2-F. In some embodiments, the first display panel DP1 is disposed on an inner portion of the display device DD-F, and the second display panel DP2 is disposed on an outer portion of the display device DD-F. Accordingly, in some embodiments, the second display panel DP2 is disposed on an opposite side of the first display panel DP1.

The first display panel DP1 or the first display part DA1-F may include a folding area FA that is configured to be in a folded state or an unfolded state, and a plurality of non-folding areas NFA1 and NFA2 spaced apart from each other with the folding area FA interposed therebetween. The folding area FA may be folded with respect to a folding axis extending in a direction parallel to long sides of the display device DD-F, e.g., a direction parallel to the first direction DR1.

The second display panel DP2 may overlap one of the non-folding areas NFA1 and NFA2. As an example, the second display panel DP2 may overlap the first non-folding area NFA1 in the third direction DR3.

A portion of the first display panel DP1, for example, a display direction of a first image IM1a displayed through the first non-folding area NFA1 may be opposite to a display direction of a second image IM2a of the second display panel DP2. As an example, the first image IM1a may be displayed to a third direction DR3, and the second image IM2a may be displayed to a fourth direction DR4 opposite to the third direction DR3. The fourth direction DR4 may be parallel but opposite to the third direction DR3.

The first display panel DP1 may include first pixels PX1 as shown in FIG. 4, and the second display panel DP2 may include second pixels PX2 as shown in FIG. 5. The second display panel DP2 may be an external display panel which faces the outside when the display device DD-F is in a folded state, and the second display panel DP2 may operate in a first mode or a second mode. As an example, in the case where the second display panel DP2 operates in the second mode, the first type pixels PX2a (e.g., as illustrated in FIG. 5) may not operate, and only the second type pixels PX2b (e.g., as illustrated in FIG. 5) may operate. The first mode may be a normal mode in which the image is displayed at a first viewing angle, and the second mode may be a viewing angle control mode in which the image is displayed at a second viewing angle smaller than the first viewing angle. Accordingly, the second display panel DP2 may operate as a "privacy display" when in the second mode.

During the operation of the second mode, a resolution of the image displayed through the second display part DA2-F may be lower than a resolution of the image displayed through the first display part DA1-F. In addition, the resolution of the image displayed through the second display part DA2-F in the second mode may be equal to or smaller than a resolution of the image displayed through the second display part DA2-F in the first mode.

Figure 12:
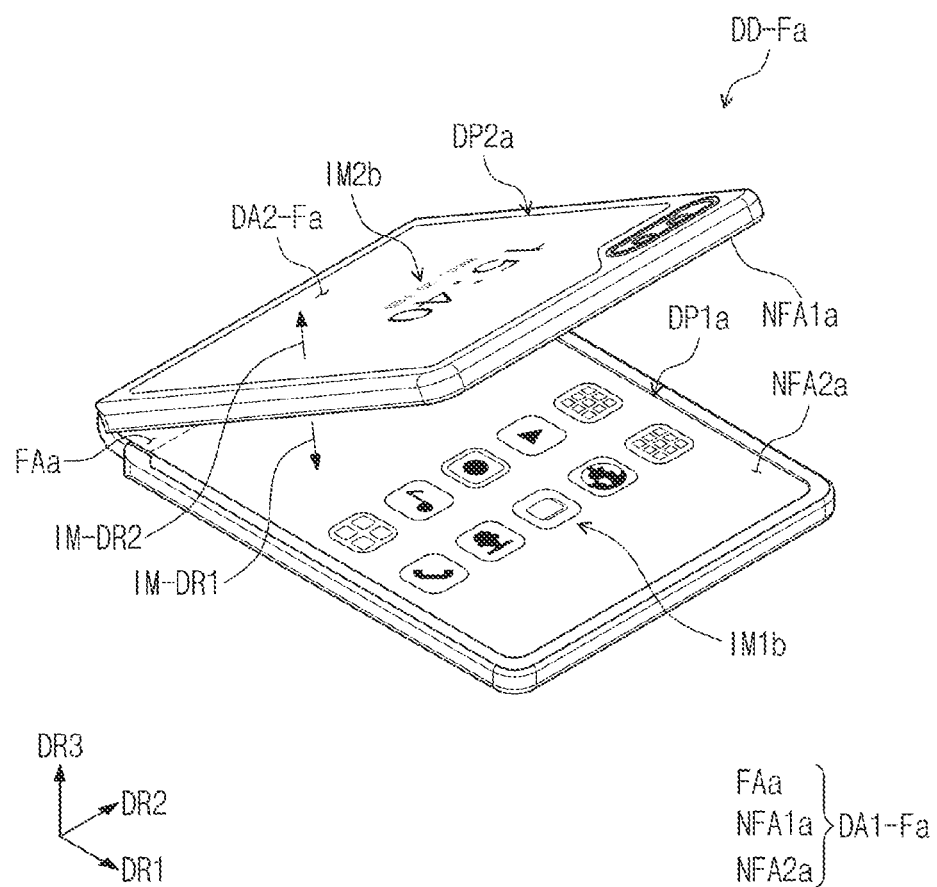
FIG. 12 is a perspective view of a display device according to an embodiment of the present disclosure.

FIG. 12 is a perspective view of a display device DD-Fa according to an embodiment of the present disclosure. Referring to FIG. 12, the display device DD-Fa may be operated in response to electrical signals. The display device DD-Fa may include a first display panel DP1a and a second display panel DP2a. The first display panel DP1a and the second display panel DP2a may be separated from each other.

The first display panel DP1a may include a first display part DA1-Fa, and the second display panel DP2a may include a second display part DA2-Fa. The first display part DA1-Fa may be larger than the second display part DA2-Fa. The first display panel DP1a or the first display part DA1-Fa may include a folding area FA configured to be in either a folded or an unfolded state, and a plurality of non-folding areas NFA1a and NFA2a spaced apart from each other with the folding area FAa disposed therebetween. The folding area FAa may be folded with respect to a folding axis extending in a direction substantially parallel to short sides of the display device DD-Fa, e.g., a direction substantially parallel to the second direction DR2.

The second display panel DP2a may overlap one of the non-folding areas NFA1a and NFA2a. As an example, the second display panel DP2a may overlap the first non-folding area NFA1a in the third direction DR3. A portion of the first display panel DP1a, e.g., a display direction IM-DR1 of a first image IM1b displayed through the first non-folding area NFA1a may be opposite to a display direction IM-DR2 of a second image IM2b displayed through the second display panel DP2a.

The first display panel DP1a may include first pixels PX1 as shown in FIG. 4, and the second display panel DP2a may include second pixels PX2 as shown in FIG. 5. According to an embodiment, the second display panel DP2a exposed to the outside may selectively operate in a first mode or a second mode. As an example, in a case where the second display panel DP2a operates in the second mode, the first type pixels PX2a (e.g., as illustrated in FIG. 5) may not operate, and only the second type pixels PX2b (e.g., as illustrated in FIG. 5) may operate. Therefore, the second display panel DP2a may act as a privacy screen when set to the second mode.

According to the embodiments described with reference to FIGS. 11A, 11B, and 12, the second display panel DP2 or DP2a of the display device DD-F or DD-Fa exposed to the outside may operate in the first mode or the second mode. A switching operation between the first mode and the second mode may be set by the user, or the first mode may be switched to the second mode when a specific application is executed. The second display panel DP2 or DP2a includes a set of pixels with a barrier structure that limits the viewing angle of the content presented by the pixels. For example, when a notification or an alert including a risk of exposing personal information, such as a message, an incoming call screen, a deposit/withdrawal message, a security message, etc., is displayed on the second display panel DP2 or DP2a, the operation mode of the second display panel DP2 or DP2a may be automatically switched from the first mode to the second mode. Accordingly, user privacy may be increased and the user experience may be improved as the user may optionally use the second display panel DP2 or DP2a as a personal image display area where the viewing angle is restricted.

The embodiments described herein are provided as examples but are not intended to limit the display devices to any one configuration. Various changes and modifications can be made by one ordinary skilled in the art within the spirit and scope of the present disclosure. Therefore, the disclosed subject matter should not be limited to any single embodiment described herein, and the scope of the present inventive concept shall be determined according to the attached claims.

What is claimed is:

1. An electronic device comprising:
a first display part configured to display a first image; and
a second display part configured to selectively operate first type pixels in a first mode and second type pixels in a second mode, wherein in the first mode, the second display part displays a second image with a first viewing angle relative to a normal line direction of the second display part based on the first type pixels, and in the second mode, the second display part displays the second image with a second viewing angle relative to the normal line direction of the second display part that is narrower than the first viewing angle based on the second type pixels, and
wherein the second image displayed through the second display part in the second mode has a resolution lower than a resolution of the first image displayed through the first display part.

2. The electronic device of claim 1, wherein the first display part comprises a plurality of first type pixels.

3. The electronic device of claim 2, wherein, in the second mode, only the second type pixels operate.

4. The electronic device of claim 1, wherein a pixel density of the second type pixels is lower than a pixel density of the first type pixels.

5. The electronic device of claim 1, wherein a resolution of the second image displayed through the second display part in the second mode is lower than a resolution of the second image displayed through the second display part in the first mode.

6. The electronic device of claim 1, wherein a resolution of the second image displayed through the second display part in the second mode is substantially the same as a resolution of the second image displayed through the second display part in the first mode.

7. The electronic device of claim 1, further comprising:
a first display panel comprising the first display part; and
a second display panel comprising the second display part, wherein the second display panel is separated from the first display panel.

8. The electronic device of claim 7, wherein the second display panel is smaller than the first display panel.

9. The electronic device of claim 7, wherein the first display panel comprises a folding area configured to be folded and unfolded, and further comprises a plurality of non-folding areas spaced apart from each other with the folding area interposed therebetween, and wherein the second display panel overlaps one of the plurality of non-folding areas of the first display panel in a thickness direction of the overlapped non-folding area.

10. The electronic device of claim 9, wherein the first display panel displays the first image in a first direction, and the second display panel displays the second image in a second direction opposite to the first direction.

11. The electronic device of claim 1, further comprising a display panel comprising the first display part and the second display part.

12. The electronic device of claim 1, further comprising at least one sensor disposed to overlap the second display part.

13. The electronic device of claim 1, wherein the second display part is smaller than the first display part.

14. The electronic device of claim 1, wherein the first display part displays the first image with a viewing angle wider than the second viewing angle.

15. An electronic device comprising:
a first display part with a first size and configured to display an image with a first viewing angle relative to a normal line direction of the first display part; and
a second display part configured to selectively operate first type pixels in a first mode and second type pixels in a second mode, wherein, in the first mode, an image is displayed with the first viewing angle relative to a normal line direction of the second display part based on the first type pixels, and in a second mode, the image is displayed with a second viewing angle relative to the normal line direction of the second display part that is narrower than the first viewing angle based on the second type pixels, and wherein the second display part has a second size smaller than the first size.

16. The electronic device of claim 15, further comprising a display panel comprising the first display part and the second display part, wherein the first display part of the display panel and second display part of the display panel display images in a same direction.

17. The electronic device of claim 15, further comprising:
a first display panel comprising the first display part; and
a second display panel comprising the second display part, wherein the second display panel is disposed on an opposing side of the first display panel and overlaps a portion of the first display panel.

18. The electronic device of claim 17, wherein a portion of the first display panel displays the image to a first direction, and the second display panel displays the image to a second direction opposite to the first direction.

19. The electronic device of claim 15, wherein the image displayed through the second display part in the second mode has a lower resolution than a resolution of the image displayed through the first display part, and wherein the resolution of the image displayed through the second display part in the second mode is equal to or smaller than a resolution of the image displayed through the second display part in the first mode.

20. The electronic device of claim 15, wherein the first display part comprises a plurality of first type pixels, and only the second type pixels operate in the second mode.

* * * * *